United States Patent [19]

Lin et al.

[11] Patent Number: 5,030,478

[45] Date of Patent: Jul. 9, 1991

[54] PROCESS FOR BONDING LUBRICANTS TO THIN FILM RECORDING MEDIA

[75] Inventors: Li-Ju J. Lin, San Jose; David D. Saperstein, Portola Valley, both of Calif.

[73] Assignee: International Business Machines Corporation, Armonk, N.Y.

[21] Appl. No.: 657,341

[22] Filed: Feb. 15, 1991

Related U.S. Application Data

[63] Continuation-in-part of Ser. No. 318,884, Mar. 3, 1989, abandoned.

[51] Int. Cl.$^5$ .......................... B05D 3/06; B05D 5/12
[52] U.S. Cl. .................................... 427/54.1; 427/131; 427/130
[58] Field of Search ...................... 427/53.1, 54.1, 130, 427/131

[56] References Cited

U.S. PATENT DOCUMENTS

| | | | |
|---|---|---|---|
| 4,404,247 | 9/1983 | Dominguez-Burguette et al. | 428/213 |
| 4,486,500 | 12/1984 | Naruo et al. | 428/336 |
| 4,526,833 | 7/1985 | Burguette et al. | 427/131 |
| 4,581,270 | 4/1986 | Kato et al. | 428/65 |
| 4,701,375 | 10/1987 | Nishimatsu et al. | 427/54.1 |
| 4,749,608 | 6/1988 | Nakayama et al. | 427/54.1 |
| 4,774,130 | 9/1988 | Endo et al. | 427/131 |
| 4,808,472 | 2/1989 | Caporiccio et al. | 427/131 |
| 4,816,334 | 3/1989 | Yokoyama et al. | 427/131 |
| 4,833,031 | 5/1989 | Kurokawa et al. | 427/131 |
| 4,840,843 | 6/1989 | Sano et al. | 427/131 |
| 4,876,117 | 12/1989 | Bornstein | 427/130 |
| 4,880,687 | 11/1989 | Yokoyama et al. | 427/131 |
| 4,912,252 | 3/1990 | Dekura et al. | 427/131 |
| 4,960,609 | 10/1990 | Homola et al. | 427/131 |

*Primary Examiner*—Shrive Beck
*Assistant Examiner*—Marianne L. Padgett
*Attorney, Agent, or Firm*—Thomas R. Berthold

[57] ABSTRACT

Thin film recording media are protected and lubricated by overcoating them with a carbon overcoat applying a lubricant to said overcoat and bonding the lubricant to the carbon overcoat by irradiating it by UV radiation.

9 Claims, No Drawings

PROCESS FOR BONDING LUBRICANTS TO THIN FILM RECORDING MEDIA

This application is a continuation-in-part of copending application Ser. No. 07/318,884 filed Mar. 3, 1989, now abandoned.

DESCRIPTION

1. Technical Field

The present invention is concerned with a process for bonding lubricants onto carbon overcoated thin film recording media.

2. Background Art

The magnetic medium of a thin film disk is very fragile and is susceptible to erosion and corrosion, and therefore, the disk surface is protected by the application of a thin layer of a hard dielectric. The interaction of the two hard, smooth surfaces of the head and disk can also cause frictional wear and stiction (static friction) which can lead to file failure. In order to eliminate this wear and decrease stiction over the life of the file, a lubricant is applied to the dielectric surface. The more lubricant that can be kept on the disk, the greater the protection from frictional wear. However, if too much lubricant is used, the head can encounter tremendous stictional forces on start-up which can prevent disk movement. Thus, an optimal thickness of lubricant must balance the requirements of no wear and low stiction. It is important that the lubricant remain on the disk over the life of the file and not desorb, spin-off or react with ambient gases. It is well-known that non-bonded lubricants will spin off a thin film disk with a carbon overcoat, and that fatty acid lubricants will evaporate from the same surface. Thin film disks do not have a mechanism for replenishment because they do not have voids to retain large amounts of excess lubricant. If the lubricant is to remain on a thin film disk for the life of the file, attachment between the dielectric and lubricant is needed.

There is an enormous amount of literature on lubricating and protecting recording media. Illustrative of such art are U. S. Pat. Nos. 4,404,247, 4,486,500 and 4,581,270. These patents, however, do not disclose the steps of the process of the present invention.

DISCLOSURE OF THE INVENTION

According to the process of the present invention, a thin film recording medium is protected and lubricated by overcoating it with a carbon overcoat, applying a lubricant to the overcoat, and then bonding the lubricant to the overcoat by irradiation with ultraviolet (UV) radiation.

The exposure of a lubricated disk to UV radiation (254 to 185 nm) causes an unexpected reorientation and adherence of the lubricant to the carbon overcoat. For example, adherence is observed for polyperfluoroethylene oxide $(RCF_2O[CF_2CF_2O]_n[CF_2O]_mCF_2R$, Ausimont) molecules with light absorbing end groups such as $R=CH_2OCH_2C_6H_3OCH_2O$ and for molecules with no apparent absorption in the wavelength range of the experiment such as $R=F$. The coverage has been shown to be uniform, because water is unable to wet the surface (contact angle 105 to 100°) following treatment of 30 Angstroms of applied lubricant. Ultraviolet treatment is applicable to fluoroethers

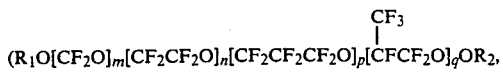

where m, n, p and q are constants ranging from 0 to the number of units in the polymer. $R_1$ and $R_2$ are end groups which may or may not be fluorinated) with and without functional end groups and to aliphatic fatty acid lubricants such as stearic acid. This method can be used alone or in combination with other post-application methods to optimize lubrication performance. In order for the lubricant to be successfully bonded to the carbon overcoat, it must be essentially incapable of polymerization when exposed to the UV radiation, and must be essentially transparent to the UV radiation in the selected intensity and frequency range, e.g. 254–185 nm. Thus the UV radiation is not capable of polymerizing the lubricant, but rather transmits through the lubricant film to irradiate the interface of the carbon overcoat and lubricant. It has been observed experimentally that for a 1,000 Angstrom film of liquid fluorether, only the lubricant which is next to the carbon surface is affected by the UV radiation.

The UV post-treatment is effective with any of the lubricant application techniques such as dipping, evaporation, wiping or spraying. After application of the lubricant, the disk is exposed to the radiation from a low pressure mercury lamp UV lamp which emits over the range 254 to 185 nm. The UV light used for the data shown in Table II has an intensity of approximately 5 milliwatts/cm$^2$ at 254 nm, and approximately 1 milliwatt/cm$^2$ at 185 nm. It has also been found that an exposure duration of approximately 1 to 15 minutes is sufficient. Oxygen and other reactive gases are excluded during irradiation by continually flushing the exposure chamber with nitrogen or other inert gas or by evacuating the chamber. The length of exposure is adjusted to the lamp emittance and to the UV absorbance of the lubricant. When the exposure time is too short, less than the desired thickness of lubricant will adhere to the carbon. When the exposure is sufficiently long, about 10 to 40 Angstroms of the lubricant will adhere to the carbon depending on the pre-exposure thickness (see Table I). After the UV treatment, the non-bonded lubricant is rinsed off the disk with an appropriate solvent such as Freon 113$^{(R)}$.

The lubricant thicknesses have been measured with ellipsometry, FT-IR and XPS. Where Freon rinsing is indicated, the non-bonded lubricant is removed by a thorough rinsing and rubbing of the surface with a cotton ball (Freon soaked Q-tip) in an aggressive procedure (Freon rinsing and rubbing 5x over a two-minute period). The protocol demonstrates the relatively strong adherence of the retained lubricant on the carbon surface.

The lubricants tested with the UV treatment method are shown in Table I. The Fomblin Z-03 and Fomblin Z-25 are low and high molecular weight fractions of the same random co-polymer of perfluoroethylene oxide and perfluoromethylene oxide. Although the Fomblin Z-03 is somewhat too volatile to use as an unanchored lubricant for long term applications, it is an effective lubricant over short time periods; its retention on a disk after UV irradiation renders it a viable lubricant. Fomblin AM2001 and Fomblin Z-DOL are functionalized Fomblin Z-03 fluoroethers in that the OCF$_3$ end groups are replaced these as shown in Table I. The effectiveness of the UV treatment in immobilizing a mixture of stearic and palmitic acids, (aliphatic fatty acids) shows that the method is applicable to these lubricants as well as to fluoroethers.

TABLE I

LUBRICANT PROPERTIES

| Lube | Molecular Wt. | Type | Molecular End Groups |
|---|---|---|---|
| Fomblin Z-03 | 3500 | Fluoroether* | $-OCF_3$ |
| Fomblin Z-15 | 9000 | Fluoroether* | $-OCF_3$ |
| Fomblin Z-25 | 13000 | Fluoroether* | $-OCF_3$ |
| Fomblin YR | 7000 | Fluoroether** | $-OCF_2CF_3$, $-OCF_2CF_2CF_3$ |
| Fomblin AM2001 | 2000–3000 | Fluoroether* | $-CH_2OCH_2-C_6H_3-$ (3,4)-$OCH_2O-$ |
| Fomblin Z-DOL | 2000–3000 | Fluoroether* | $-CH_2OH$ |
| Stearic/Palmitic Acid | ≈270 | Fatty Acid | $-COOH, -CH_3$ |

\*$-(CF_2CF_2O)_m(CF_2O)_n-$
\*\*$-(CF(CF_3)CF_2O)_q(CF_2O)_p-$

A listing of the results of the UV treatment on the different lubricants is shown in Table II.

TABLE II

ADHESION OF LUBRICANTS AFTER UV TREATMENT

| Lube | Initial Thickness (Å) | Exposure Time (min) | Thickness After Exposure (Å) | Thickness After Rinsing (Å) | Start/Stop Test Results |
|---|---|---|---|---|---|
| Fomblin Z-03 | 30 | 10 | | 20 (105°)* | 5–20 g stiction/20000 cycles |
| | 200 (74°) | 0 | | <1 | |
| | 1000 | 100 | | 34 (109°) | |
| Fomblin Z-15 | 20 | 10 | 20 (103°) | 12 (102°) | |
| Fomblin Z-25 | 1000 | 60 | | 35 | |
| Fomblin YR | 70 | 20 | 65 (110°) | 15 (107°) | |
| Fomblin AM2001 | 15 | 10 | | 12 | 12–23 g stiction/2000 cycles |
| | 30 (70°) | 0 | | 4 | |
| | 37 | 3 | 37 (104°) | 37 (101°) | |
| Fomblin Z-DOL | 16 | 15 | 10 (105°) | 9 (100°) | |
| | 30 (65°) | 0 | | 2 | |
| | 42 | 15 | 31 (104°) | 30 (101°) | |
| Stearic/Palmitic Acid | 30 | 30 | 15 | 14 (81°) | |
| | 120 (≈60°) | 60 | 36 (92°) | 30 (92°) | |

*Water contact angle

A generalized conclusion for the data of Table II is that the carbon surface, which is somewhat hydrophilic (water contact angle <90°) even with lubricant, is made quite hydrophobic (water contact angle >90°) after exposure to the UV radiation. For example, after UV irradiation of 35 Angstroms or more of Fomblin Z-03 on a disk, the water contact angle is about 105 to 110° which implies that the surface is nearly completely modified so that it has very low free energy - equivalent to PTFE (Teflon). Although not as hydrophobic as the UV treated flluoroethers, the stearic/palmitic acid also shows that its surface is modified significantly by the UV radiation because the water contact angle increases from 60 to 92° after treatment. It is not surprising that the amount of lubricant adhering to the carbon surface is a function of the initial thickness and UV exposure time as observed in Table II. However, there appears to be a maximum amount of about a monolayer of fluoroether lubricant that adheres to the carbon-overcoated disk surface no matter how long the UV treatment and how much excess lubricant is used.

The data for the Fomblin AM2001 show that three minutes of UV treatment is sufficient to retain 100% of the initial 37 Angstroms deposited. Although small amounts of Fomblin AM2001 and Fomblin Z-DOL adhere to carbon overcoats in the absence of any treatment (Table II), the surface coverage is no more than 2 to 4 Angstroms and the water contact angle of 65 to 70°) indicates partial hydrophilicity. The UV treated surface which is lubricated with less than 10 Angstroms of a fluoroether is quite hydrophobic whereas the unirradiated surface with applied lubricant remains somewhat hydrophilic. For example, 8 Angstroms of retains Fomblin Z-03 and 9 Angstroms of retained Fomblin Z-DOL have water contact angles of 96° and 100°, respectively. Two hundred Angstroms of Fomblin Z-03 on a carbon overcoat has a water contact angle of only 74°. For a particular lubricant and initial lubricant film thickness on the disk, the UV intensity, frequency and time of exposure can be determined experimentally in order to create the desired amount of bonded lubricant following the rinsing of the unbonded lubricant. The experimentally determined UV radiation thus transmits through the liquid lubricant film to the interface of the carbon overcoat and the lubricant without polymerizing or curing the lubricant. In two cases shown in Table II, we have tested the UV-treated disks for their functional performance (start/stop) with a ferrite slider. In both cases, the stiction remained low and fairly uniform over the life of the test.

It should be noted as an additional advantage of the present invention that its benefits are obtained without stressing the disk with high temperature or with plasma irradiation.

We claim:

1. A process for protecting and lubricating a thin film recording medium, said process comprising the steps of:
   (a) forming a carbon overcoat on the thin film recording medium,
   (b) applying to said carbon overcoat a liquid film of a lubricant of the type which is essentially incapable of polymerization when exposed to UV radiation of a predetermined intensity and range, and (c) bonding the lubricant to the carbon overcoat by transmitting said UV radiation through said liquid film to irradiate the interface of the carbon overcoat and the lubricant.

2. A process as claimed in claim 1 wherein the step of bonding further comprises irradiating with UV radiation in an essentially oxygen-free atmosphere.

3. A process as claimed in claim 1 in which the lubricant is a fluoroether having no reactive groups.

4. A process as claimed in claim 1 in which the UV radiation has an intensity of approximately 1 to 5 milliwatts/cm$^2$ and takes place in a time of from about 1 to about 15 minutes.

5. A process as claimed in claim 1 in which the UV radiation is in the range 185 to 254 nm.

6. A process as claimed in claim 1 in which the lubricant has a reactive end group.

7. A process as claimed in claim 1 in which the lubricant is an aliphatic fatty acid.

8. A process as claimed in claim 1 in which the lubricant is a fluoroether having linear or branched molecular structure.

9. A process as claimed in claim 1 in which the length of exposure is adjusted to the UV radiation intensity and to the UV absorbance of the lubricant.

* * * * *